(12) United States Patent
Tamura

(10) Patent No.: US 8,254,721 B2
(45) Date of Patent: Aug. 28, 2012

(54) DATA INPUT SYSTEM, DATA INPUT RECEIVING DEVICE, DATA INPUT RECEIVING METHOD AND COMPUTER READABLE MEDIUM

(75) Inventor: Junichi Tamura, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 373 days.

(21) Appl. No.: 12/619,200

(22) Filed: Nov. 16, 2009

(65) Prior Publication Data

US 2010/0303382 A1    Dec. 2, 2010

(30) Foreign Application Priority Data

May 26, 2009    (JP) ................................. 2009-126649

(51) Int. Cl.
*G06K 9/64* (2006.01)
*G06K 9/20* (2006.01)
(52) U.S. Cl. ......... 382/278; 382/312; 382/229; 382/182
(58) Field of Classification Search .................. 382/100, 382/182, 190, 198, 200, 229, 278, 292, 325
See application file for complete search history.

(56) References Cited

U.S. PATENT DOCUMENTS

| | | | | |
|---|---|---|---|---|
| 5,821,929 A | * | 10/1998 | Shimizu et al. | 382/190 |
| 5,900,005 A | * | 5/1999 | Saito | 715/210 |
| 7,593,961 B2 | * | 9/2009 | Eguchi et al. | 1/1 |
| 7,836,010 B2 | * | 11/2010 | Hammond et al. | 707/705 |
| 8,059,896 B2 | * | 11/2011 | Ito | 382/177 |

FOREIGN PATENT DOCUMENTS

| | | | |
|---|---|---|---|
| JP | 08-272908 A | | 10/1996 |
| JP | 2006-244315 | * | 9/2006 |
| JP | 2006-244315 A | | 9/2006 |

* cited by examiner

*Primary Examiner* — Stephen R Koziol

(74) *Attorney, Agent, or Firm* — Sughrue Mion, PLLC

(57) ABSTRACT

A data input system includes: an image reader reading, on a form basis, an original image of each form filled with characters; extracting original image data pieces by dividing, on a character basis, the original image data, and setting identification information to each original image data piece for defining positions; for each original image data pieces, associated character-associated information; and making output with a correlation among the original image data pieces, the identification information set to each original image data piece, and the character-associated information for each original image data piece; and a data input receiver displaying any original image data piece selected according to a predetermined procedure; receiving input of text data to identify which character is represented by each original image data piece; and making storage by correlating the text data with the original image data pieces and the identification information set to each original image data piece.

11 Claims, 20 Drawing Sheets

| IDENTIFICATION INFORMATION | | | CHARACTERISTICS INFORMATION | INPUT DATA | |
|---|---|---|---|---|---|
| FORM ID | ITEM ID | EXTRACTION ORDER | | | 32 |
| A001 | a | 1 | VERTICAL 1:HORIZONTAL 4 | 東 | 321 |
| A001 | a | 2 | VERTICAL 2:HORIZONTAL 3 | | |
| A001 | ... | ... | ... | | |
| A001 | b | 1 | VERTICAL 1:HORIZONTAL 4 | 東 | 321 |
| A001 | b | 2 | VERTICAL 2:HORIZONTAL 6 | | |
| A001 | ... | ... | ... | | |
| A002 | a | 1 | VERTICAL 1:HORIZONTAL 4 | | |
| A002 | a | 2 | VERTICAL 2:HORIZONTAL 2 | | |
| A002 | ... | ... | ... | | |
| A002 | b | 1 | VERTICAL 1:HORIZONTAL 2 | | |
| A002 | b | 2 | VERTICAL 2:HORIZONTAL 5 | | |
| A002 | ... | ... | ... | | |
| ... | ... | ... | ... | | |

FIG.3
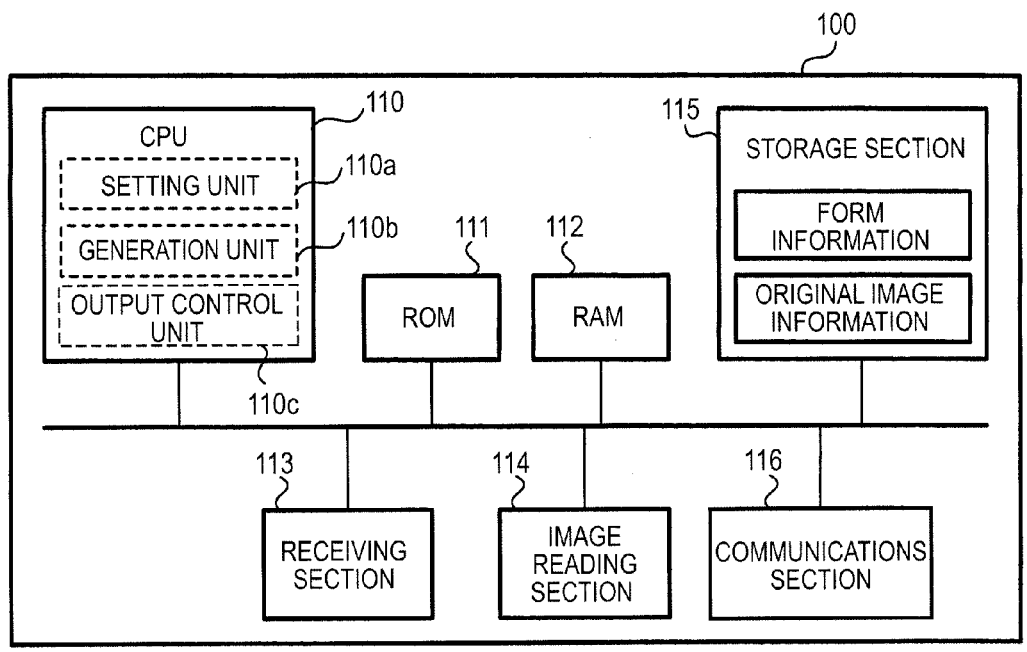
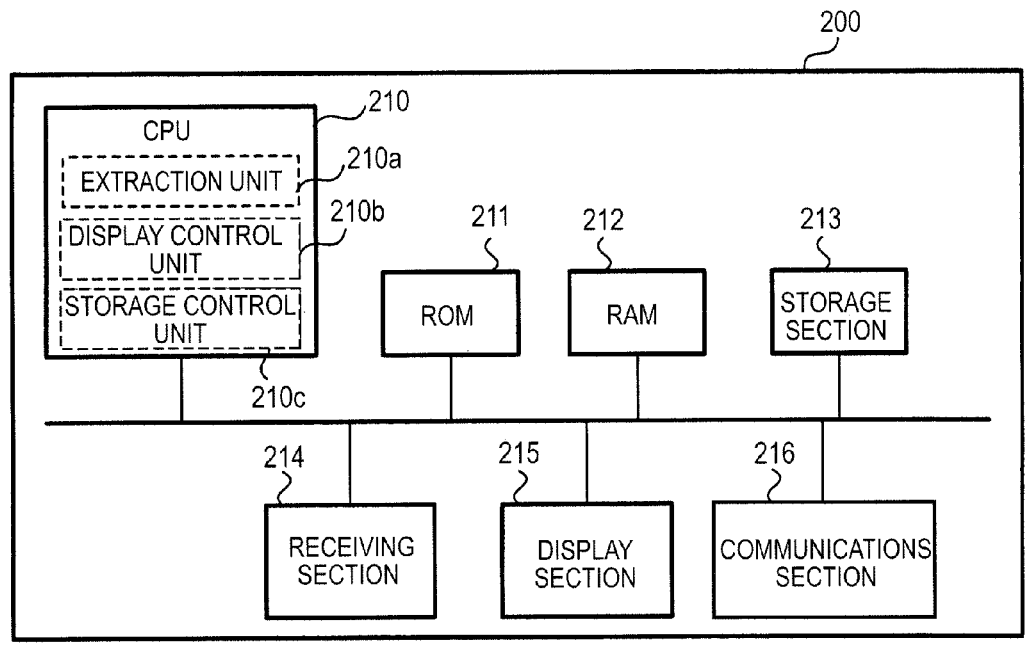

FIG.5

| IDENTIFICATION INFORMATION | | | CHARACTERISTICS INFORMATION | INPUT DATA |
|---|---|---|---|---|
| FORM ID | ITEM ID | EXTRACTION ORDER | | |
| A001 | a | 1 | VERTICAL 1:HORIZONTAL 4 | |
| A001 | a | 2 | VERTICAL 2:HORIZONTAL 3 | |
| A001 | ⋮ | ⋮ | ⋮ | |
| A001 | b | 1 | VERTICAL 1:HORIZONTAL 4 | |
| A001 | b | 2 | VERTICAL 2:HORIZONTAL 6 | |
| A001 | ⋮ | ⋮ | ⋮ | |
| A002 | a | 1 | VERTICAL 2:HORIZONTAL 3 | |
| ⋮ | ⋮ | ⋮ | ⋮ | |

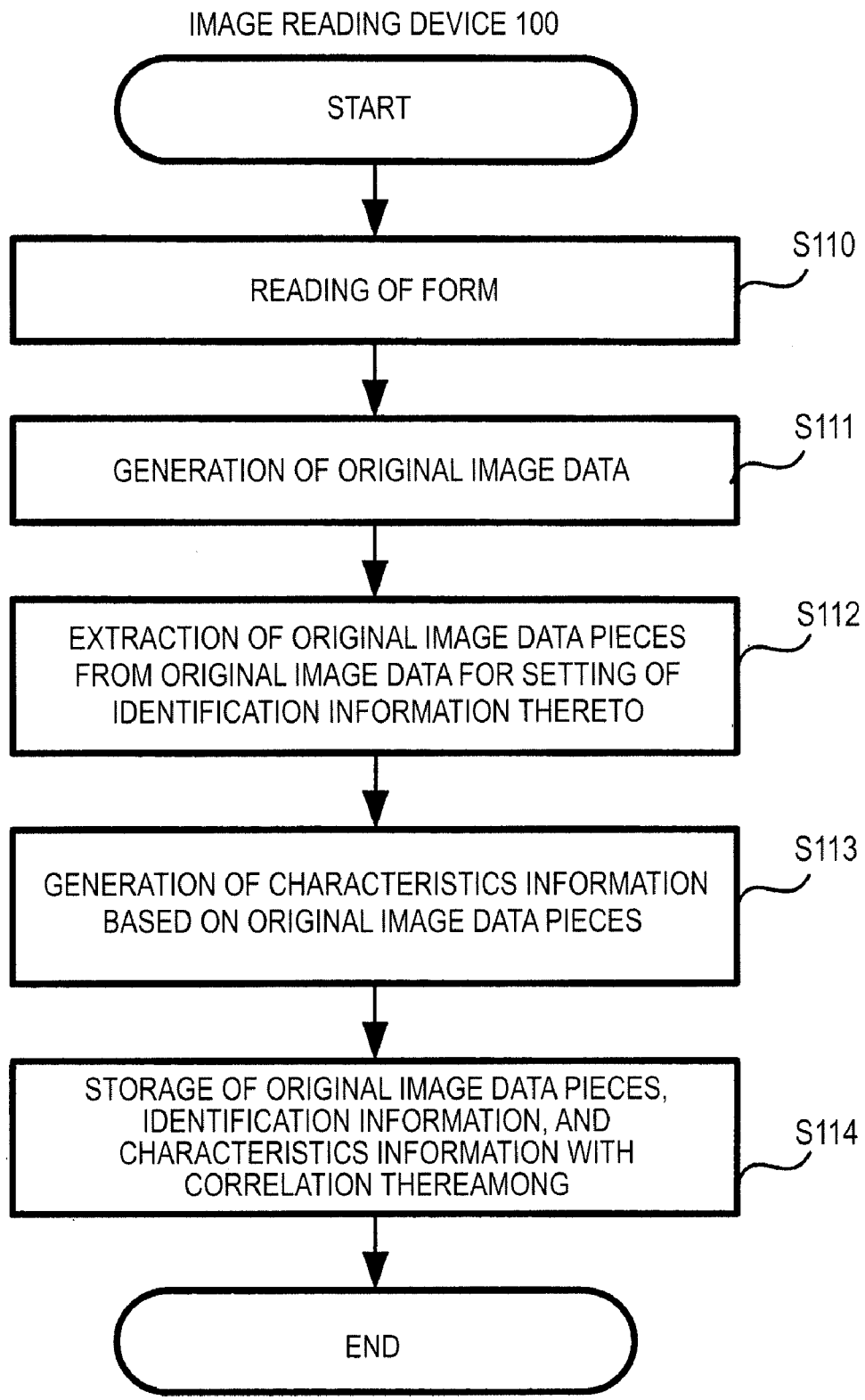

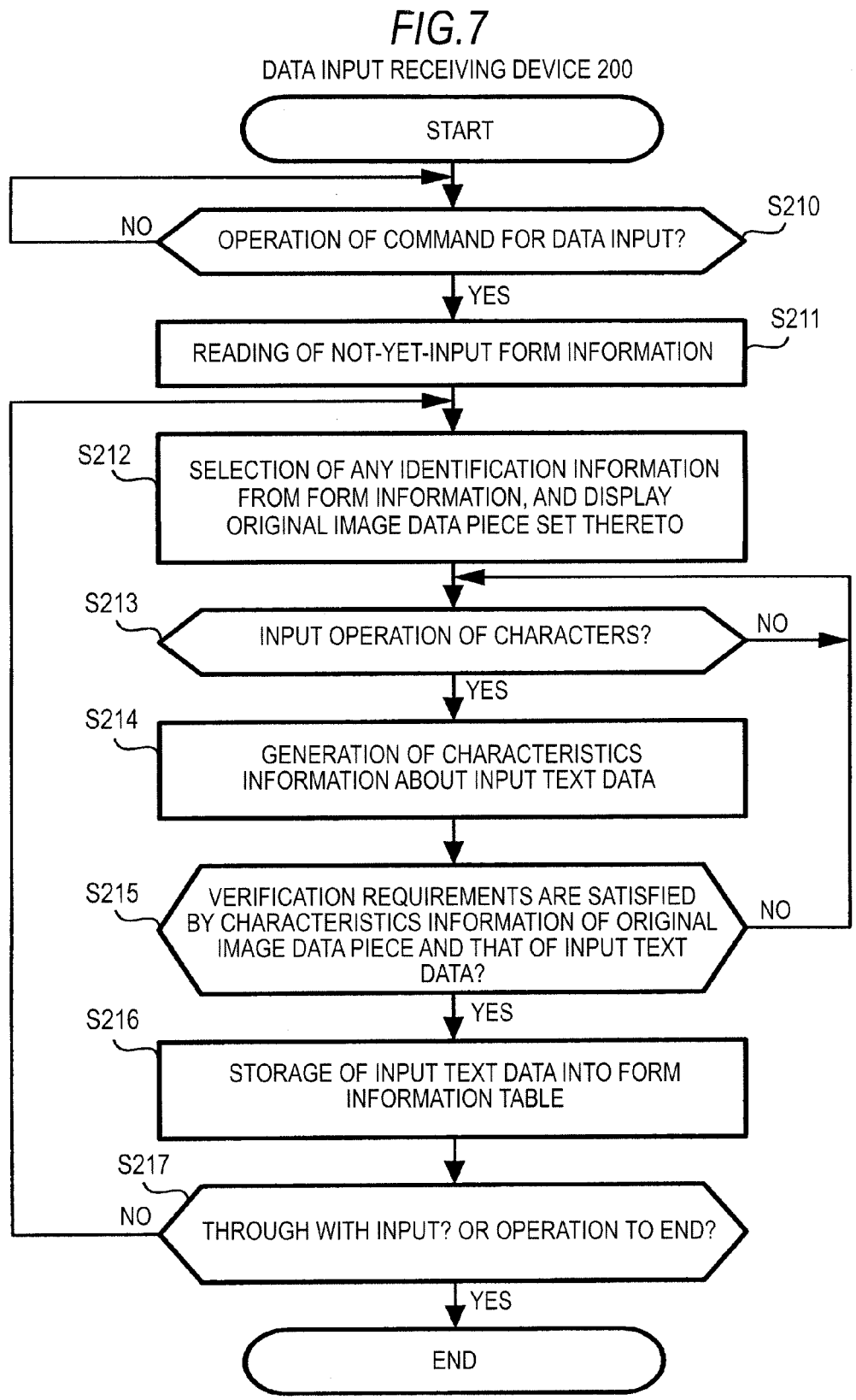

FIG.9

| IDENTIFICATION INFORMATION | | | CHARACTERISTICS INFORMATION | INPUT DATA |
|---|---|---|---|---|
| FORM ID | ITEM ID | EXTRACTION ORDER | | |
| A001 | a | 1 | VERTICAL 1:HORIZONTAL 4 | 東 |
| A001 | a | 2 | VERTICAL 2:HORIZONTAL 3 | |
| A001 | a | ⋮ | ⋮ | |
| A001 | b | 1 | VERTICAL 1:HORIZONTAL 4 | 東 |
| A001 | b | 2 | VERTICAL 2:HORIZONTAL 6 | |
| A001 | b | ⋮ | ⋮ | |
| A002 | a | 1 | VERTICAL 1:HORIZONTAL 4 | |
| A002 | a | 2 | VERTICAL 2:HORIZONTAL 2 | |
| A002 | b | 1 | VERTICAL 1:HORIZONTAL 2 | |
| A002 | b | 2 | VERTICAL 2:HORIZONTAL 5 | |
| ⋮ | ⋮ | ⋮ | ⋮ | |

*FIG.10*

| | | | | | | | | | |
|---|---|---|---|---|---|---|---|---|---|
| ZIP CODE | 5 | 6 | 7 | — | 1 | 2 | 4 | 3 | |
| NAME | 神 | 奈 | 川 | 県 | X | X | 市 | Z | 町 |
| TELEPHONE NUMBER | 岡 | 田 | 静 | 子 | | | | | |

FORM 002
FORM 001

401 — ZIP CODE
402 — NAME
403 — TELEPHONE NUMBER
411
412
413
40
40

FIG.11

| IDENTIFICATION INFORMATION | | | RECOGNIZED CHARACTER | INPUT DATA |
|---|---|---|---|---|
| FORM ID | ITEM ID | EXTRACTION ORDER | | |
| B001 | a | 1 | 5 | |
| B001 | a | 2 | 6 | |
| B001 | a | 3 | 7 | |
| B001 | a | 4 | 1 | |
| B001 | a | 5 | 2 | |
| B001 | a | 6 | 4 | |
| B001 | a | 7 | 3 | |
| B001 | ... | ... | ... | |
| ... | ... | ... | ... | |

42

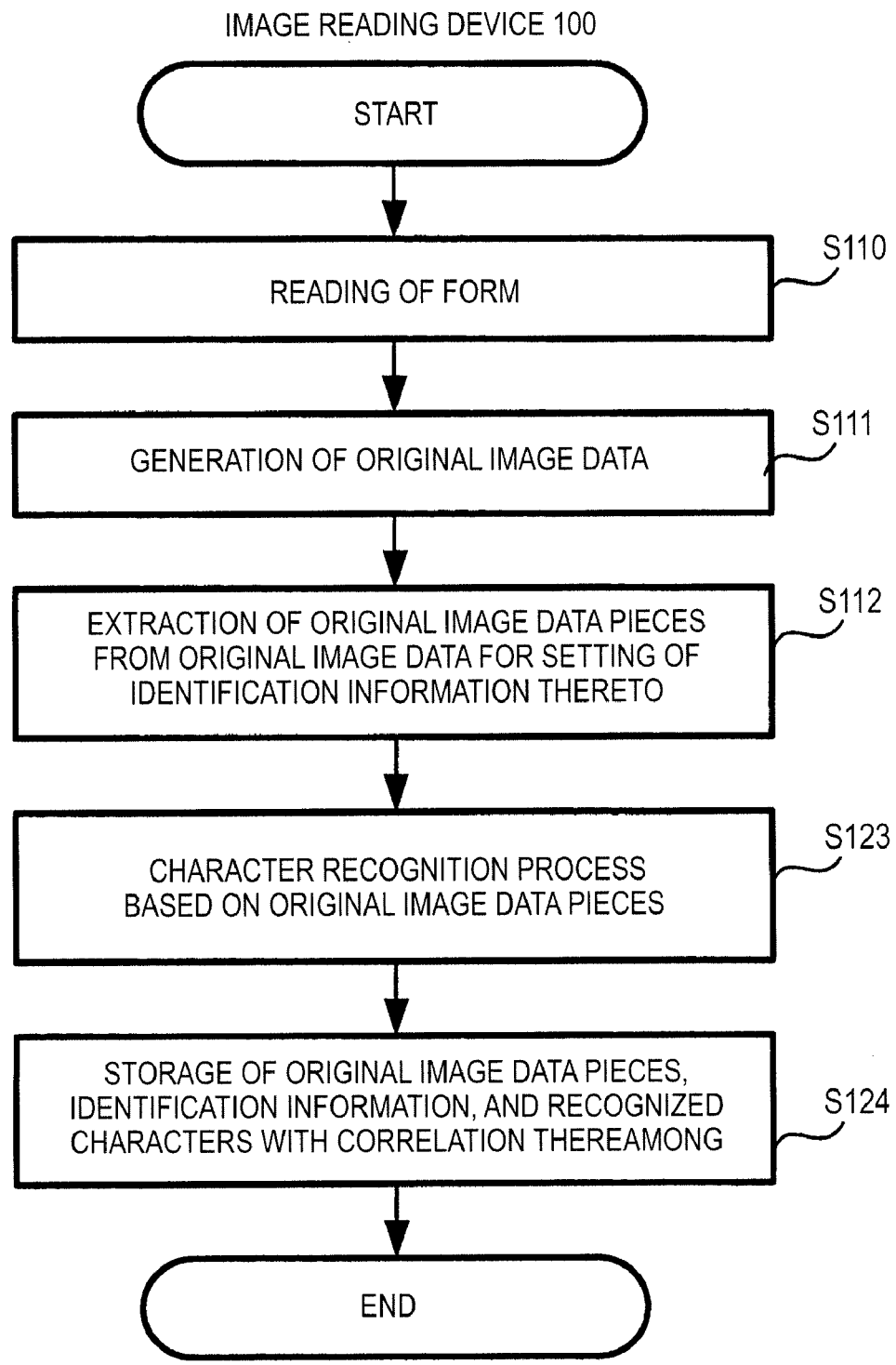

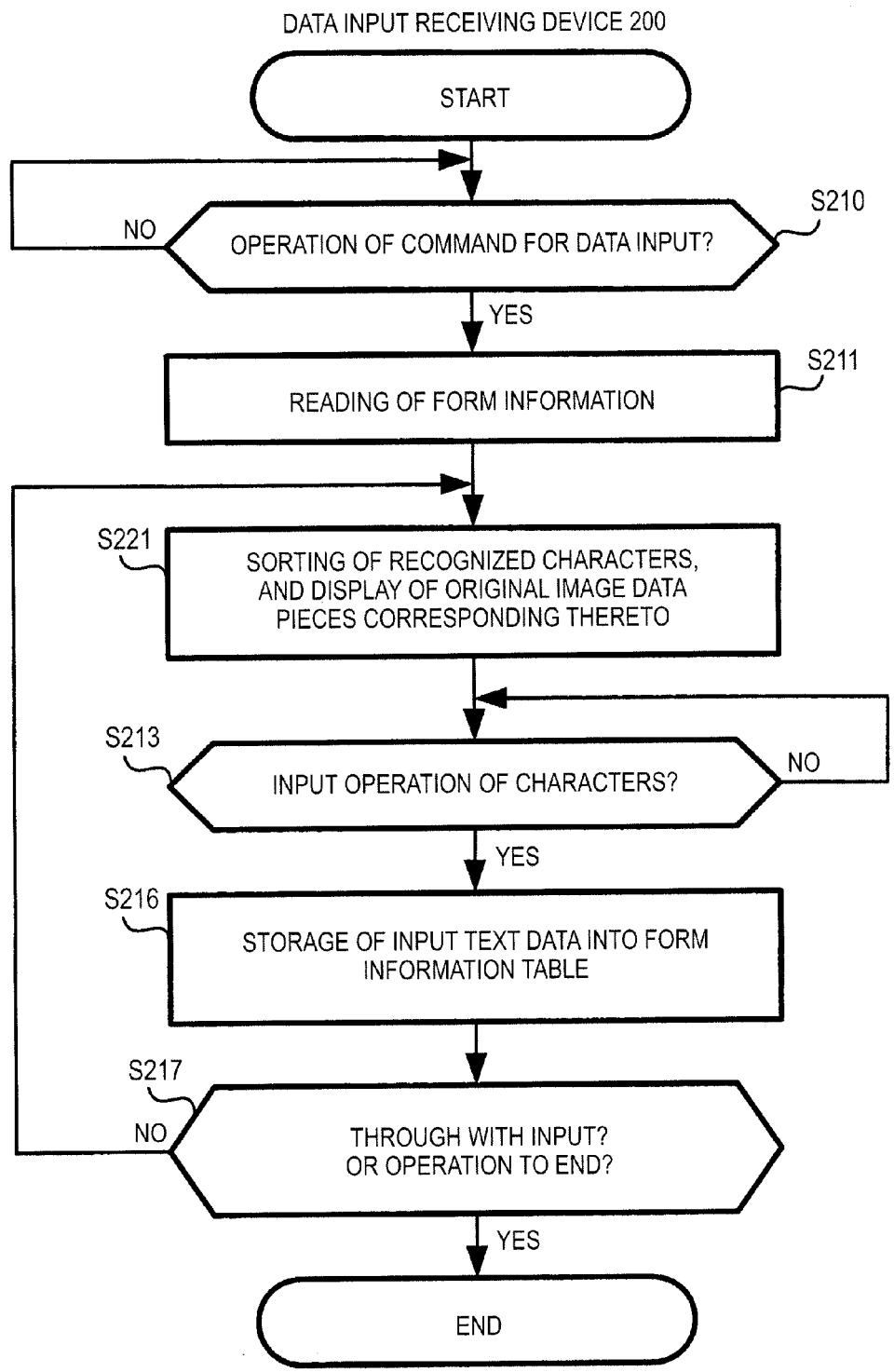

FIG.15

| IDENTIFICATION INFORMATION | | | RECOGNIZED CHARACTER | INPUT DATA | |
|---|---|---|---|---|---|
| FORM ID | ITEM ID | EXTRACTION ORDER | | | 42 |
| B001 | a | 1 | 5 | 5 | |
| B001 | a | 2 | 6 | 6 | |
| B001 | a | 3 | 7 | 7 | |
| B001 | a | 4 | 1 | 1 | 421 |
| B001 | a | 5 | 2 | 2 | |
| B001 | a | 6 | 4 | 4 | |
| B001 | a | 7 | 3 | 3 | |
| B001 | ... | ... | ... | ... | |
| ... | ... | ... | ... | ... | |

FIG.16

| WORD ID | WORD |
|---------|------|
| 1 | 北海道 |
| ... | ... |
| 10 | 静岡県 |
| ... | ... |
| 15 | 鹿児島県 |
| 16 | 冷たい |
| 17 | パソコン |
| ... | ... |
| 80 | 行く |
| ... | ... |

| IDENTIFICATION INFORMATION | | | RECOGNIZED CHARACTER | INPUT DATA |
|---|---|---|---|---|
| FORM ID | ITEM ID | EXTRACTION ORDER | | |
| B001 | a | 1 | 5 | |
| B001 | a | 2 | 6 | |
| B001 | ... | ... | ... | |
| B001 | b | 1 | 神 | |
| B001 | b | 2 | 奈 | |
| B001 | b | 3 | 川 | |
| B001 | b | 4 | 県 | |
| B001 | ... | ... | ... | |
| B001 | c | 1 | 岡 | |
| B001 | c | 2 | 田 | |
| B001 | c | 3 | 静 | |
| B001 | c | 4 | 子 | |
| B001 | ... | ... | ... | |
| ... | ... | ... | ... | |

42

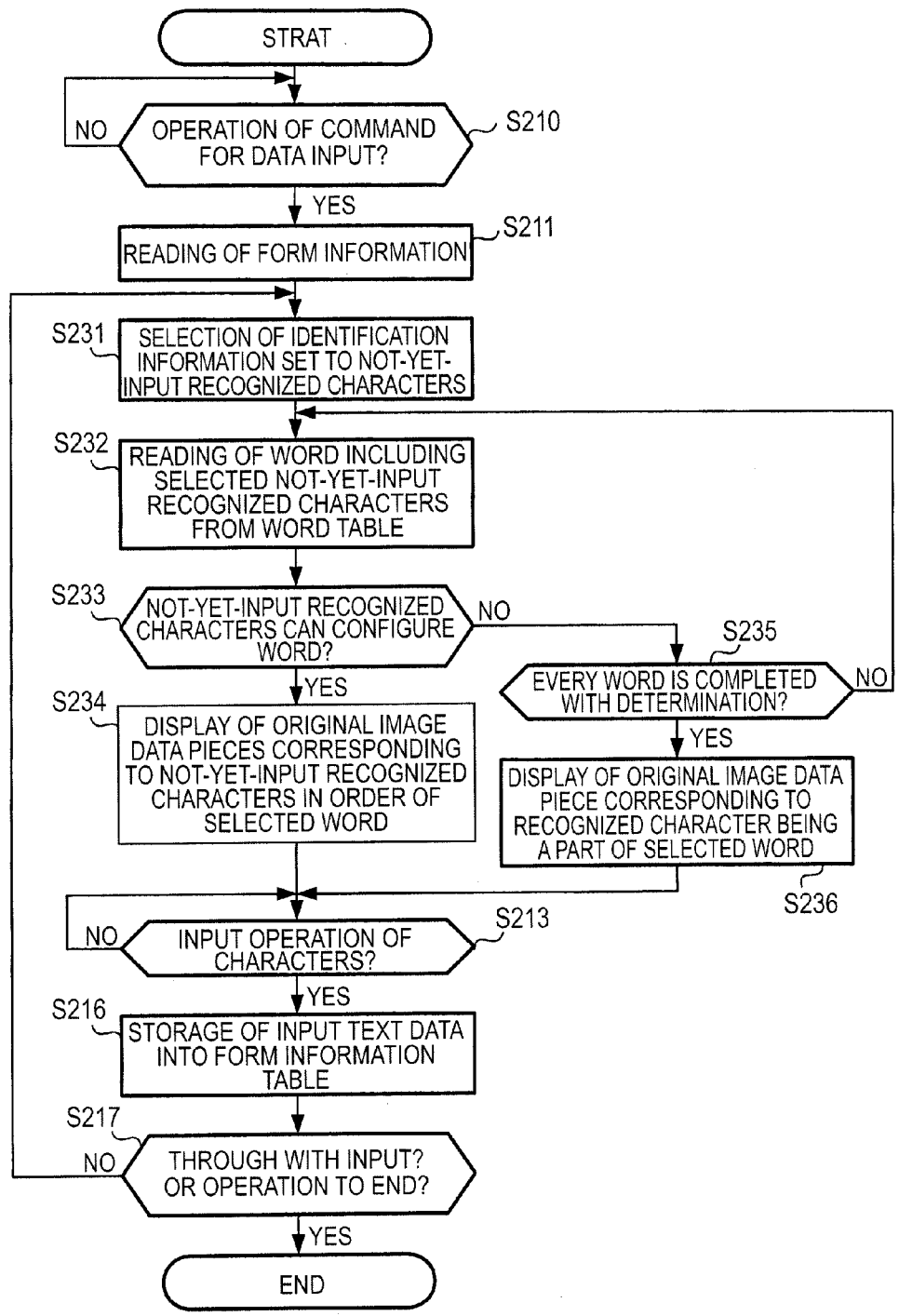

FIG.20

| IDENTIFICATION INFORMATION | | | RECOGNIZED CHARACTER | INPUT DATA |
|---|---|---|---|---|
| FORM ID | ITEM ID | EXTRACTION ORDER | | |
| B001 | a | 1 | 5 | |
| B001 | a | 2 | 6 | |
| B001 | ... | ... | ... | |
| B001 | b | 1 | 神 | |
| B001 | b | 2 | 奈 | |
| B001 | b | 3 | 川 | |
| B001 | b | 4 | 県 | 県 |
| B001 | ... | ... | ... | |
| B001 | c | 1 | 岡 | 岡 |
| B001 | c | 2 | 田 | |
| B001 | c | 3 | 静 | 静 |
| B001 | c | 4 | 子 | |
| B001 | ... | ... | ... | |
| ... | ... | ... | ... | |

DATA INPUT SYSTEM, DATA INPUT RECEIVING DEVICE, DATA INPUT RECEIVING METHOD AND COMPUTER READABLE MEDIUM

CROSS-REFERENCE TO RELATED APPLICATIONS

This application is based on and claims priority under 35 USC 119 from Japanese Patent Application No. 2009-126649 filed May 26, 2009.

BACKGROUND

1. Technical Field

The present invention relates to a data input system, and a data input receiving device, a data input receiving device, and a computer readable medium.

2. Related Art

For data input of forms filled with personal information such as addresses and names, various technologies have been proposed for preventing leakage of such personal information.

SUMMARY

A first aspect of the present invention is directed to a data input system that includes: an image reading device provided with: a reading unit for reading, on a form basis, an original image of each form filled with characters; a setting unit for extracting original image data pieces as a result of dividing, on a character basis, data of the original image of the form read by the reading unit, and setting identification information to each of the original image data pieces for defining positions thereof on the form; a generation unit for generating, for each of the original image data pieces extracted by the setting unit, character-associated information associated therewith; and an output control unit for making an output with a correlation among the original image data pieces, the identification information set to each of the original image data pieces, and the character-associated information generated for each of the original image data pieces; and a data input receiving device provided with: a display control unit for displaying any of the original image data pieces selected in accordance with a predetermined procedure from the original image data pieces provided by the output control unit; a receiving unit for receiving an input of text data for use to identify which character is represented by each of the original image data pieces displayed by the display control unit; and a storage control unit for making storage by correlating the text data received by the receiving unit with the original image data pieces displayed by the display control unit and the identification information set to each of the original image data pieces.

BRIEF DESCRIPTION OF THE DRAWINGS

Exemplary embodiments of the present invention will be described in detail based on the following figures, wherein:

FIG. 3 is a block diagram of an image reading device and that of a data input receiving device in the first exemplary embodiment;

FIG. 5 shows exemplary data in a form information table in the first exemplary embodiment;

FIG. 6 is a flow diagram of an operation of the image reading device in the first exemplary embodiment;

FIG. 7 is a flow diagram of an operation of the data input receiving device in the first exemplary embodiment;

FIG. 9 is a diagram showing another exemplary data in the form information table in the first exemplary embodiment;

FIG. 10 is a diagram showing an exemplary form in a second exemplary embodiment;

FIG. 11 shows exemplary data in a form information table in the second exemplary embodiment;

FIG. 12 is a flow diagram of an operation of the image reading device in the second exemplary embodiment;

FIG. 13 is a flow diagram of an operation of the data input receiving device in the second exemplary embodiment;

FIG. 15 is a diagram showing another exemplary data in the form information table in the second exemplary embodiment;

FIG. 16 shows exemplary data in a word table in a third exemplary embodiment;

FIG. 17 shows exemplary data in a form information table in the third exemplary embodiment;

FIG. 18 is a flow diagram of an operation of the data input receiving device in the third exemplary embodiment;

FIG. 20 shows another exemplary data in the form information table in the third exemplary embodiment.

DETAILED DESCRIPTION

In the below, described is a data input system in exemplary embodiments of the invention by referring to the accompanying drawings.

First Exemplary Embodiment

Overview

Figure 1:
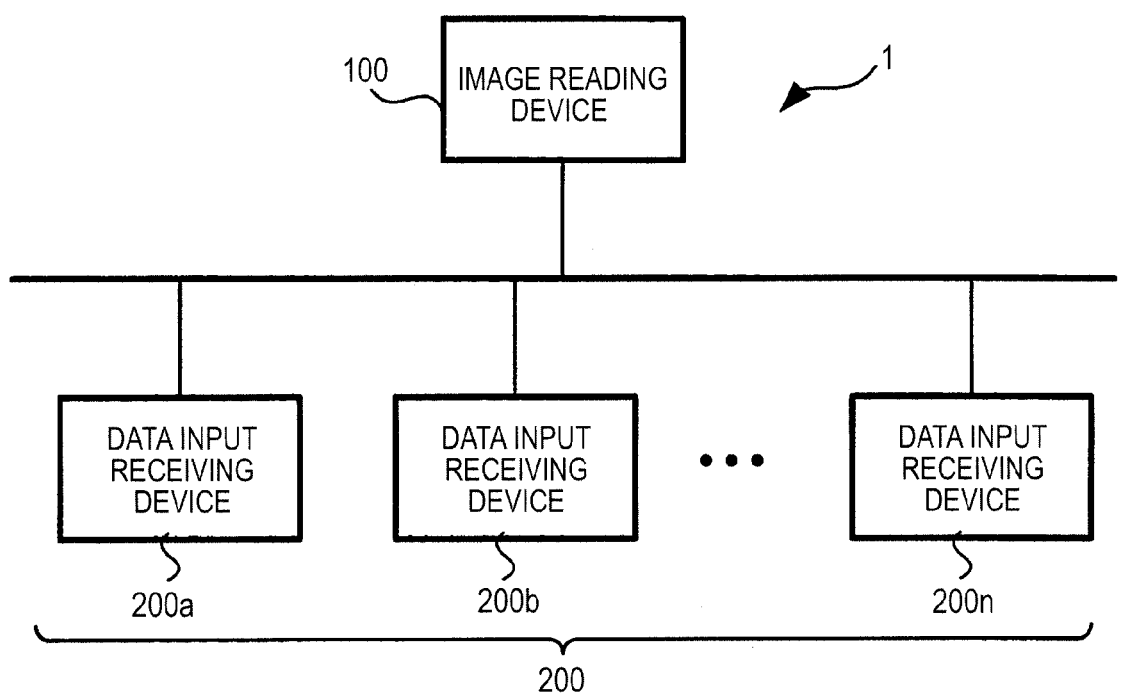
FIG. 1 is a diagram showing an exemplary configuration of a data input system of the invention.

FIG. 1 shows an exemplary configuration of a data input system in a first exemplary embodiment. As shown in FIG. 1, a data input system 1 is configured to include an image reading device 100, and a plurality of data input receiving devices 200a to 200n (hereinafter, referred to collectively as data input receiving devices 200 when no device discrimination is required). The image reading device 100 and the data input receiving devices 200 are connected to one another over a communications unit such as LAN (Local Area Network).

Figure 2:
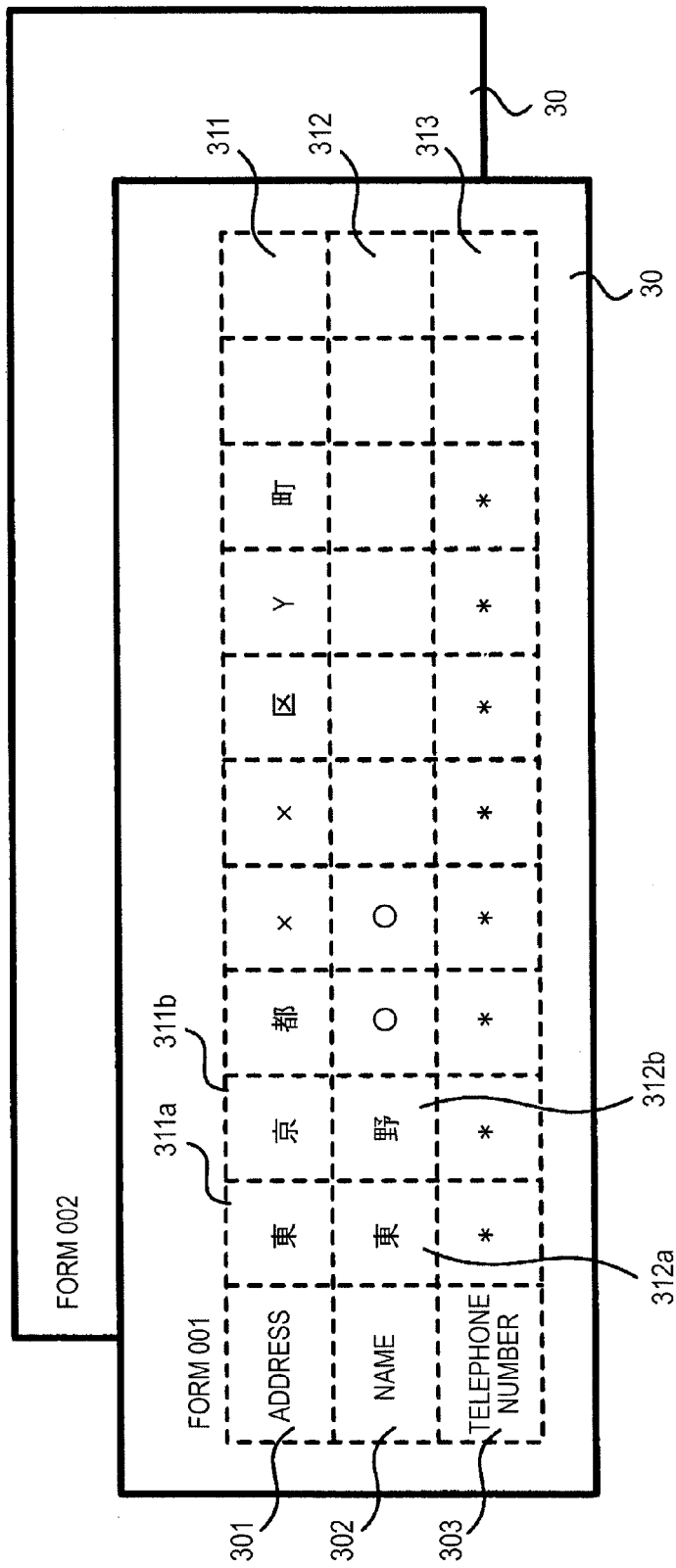
FIG. 2 is a diagram showing exemplary data in a form in a first exemplary embodiment.

In the data input system 1 in this exemplary embodiment, the image reading device 100 is operated to read hand-written characters filled in a form 30 of a predetermined format as shown in FIG. 2, i.e., segmented into form items 301 to 303 to be respectively filled with address, name, telephone number, and others. In the data input receiving devices 200, by referring to the hand-written characters read as such, text data, e.g., text code, is input for use to identify the characters. Such data input is made using a word processor function, i.e., kana-kanji conversion function, by a person who is in charge of data input of the form (hereinafter, such a person is referred to as "operator").

Note here that the form in this exemplary embodiment is exemplified as being a paper medium segmented in advance into form items to be filled with details, but may not be restricted by type as long as being a medium filled with hand-written character strings in advance by a person concerned.

Configuration

FIG. 3 is a block diagram showing the configuration of the image reading device 100, and that of the data input receiving device 200, which are the configuration components of the data input system 1. In the below, described are the configurations of such devices.

Image Reading Device 100

The image reading device 100 is implemented by a scanner device, and is configured to include a CPU (Central Processing Unit) 110, a ROM (Read Only Memory) 111, a RAM (Random Access Memory) 112, a receiving section 113, an image reading section 114, a storage section 115, and a communications section 116. The CPU 110 is operated to run a control program stored in the ROM 111 using the RAM 112 as a work area, thereby allowing components therein to function, i.e., a setting unit 110a, a generation unit 110b, and an output control unit 110c, and controlling the components connected to the CPU 110.

That is, the setting unit 110a divides image data on the basis of a predetermined number of pixels for extraction. The image data here is a read result of each form by the image reading section 114 that will be described later, and such image data is hereinafter referred to as original image data. The division results of the original image data extracted as such (hereinafter, referred to as original image data pieces) are each set with identification information for identification use thereof. The generation unit 110b extracts, from the hand-written characters in the original image data pieces extracted by the setting unit 110a, any characteristics of each of the hand-written characters, and generates characteristics information thereabout for use as characters-associated information thereabout. The output control unit 110c stores, into the storage section 115, original image information including the original image data pieces extracted by the setting unit 110a, and the identification information each thereof. The output control unit 110a then correlates the identification information with the characteristics information about each of the original image data pieces generated by the generation unit 110b, and writes the correlation result into a form information table. Note here that the unit of division and the characteristics about the hand-written characters will be described later.

The receiving section 113 includes a power switch of the image reading device 100, an operation switch for operating the image reading section 114, and others. Such a receiving section 113 forwards information about the details of a user operation to the CPU 110. The image reading section 114 performs scanning by directing a light onto the filling surface of the form 30 placed on the image reading device 100, and sequentially forwards an electric signal to the CPU 110. The electric signal is a result of photoelectric conversion applied to the lights reflected by the form and received by a CCD (Charge Coupled Device).

The storage section 115 is configured by a nonvolatile storage medium such as hard disk, and stores the original image information and data such as form information table. Note here that a detailed description will be given later about the original image information and the form information table. The communications section 116 forwards/receives data to/from the data input receiving devices 200 under the control of the CPU 110.

Data

Described next is data for storage into the storage section 115. First of all, described are the original image data pieces in the first exemplary embodiment.

As shown in FIG. 2, in the form 30, the form items 301 to 303 are provided with fill-in areas 311 to 313, respectively. The fill-in areas 311 to 313 are each segmented by broken lines into a plurality of areas each for a character. The original image data about the form 30 is subjected to raster scanning sequentially on a pixel basis starting from a pixel on the upper left. As a result, the original image data is divided on the basis of such a fill-in area for each of the form items so that original image data pieces each about a character are extracted. Herein, the original image data pieces to be extracted as such are the image data including the hand-written characters, and the fill-in areas are each subjected to an automatic determination to see whether or not the number of black pixels therein is equal to or larger than a predetermined value. The determination result is then used to check whether or not the fill-in areas include any hand-written characters. The original image data pieces to be extracted are each set with identification information for identification use thereof. The identification information includes a form ID, an item ID, and an extraction order, and is set after the extraction of the original image data pieces. The form ID is for identifying which form includes which of the original image data pieces, and the item ID is for identifying which form item. The extraction order indicates the order of the original image data pieces extracted for each of the form items. The extraction results, i.e., the original image data pieces and the identification information, are stored in a predetermined area in the storage section 115 as original image information. As such, the identification information in this exemplary embodiment is configured in the extraction order as a result of raster scanning of the form, and includes information about the positions of the original image data pieces in the form.

Note here that the form ID in the identification information may be an ID found in the form through character recognition, or a bar-code printed on the form found by reading, for example. Alternatively, the image reading device 100 may set a form ID based on the date or order of the reading process. Moreover, an item ID set in advance may be assigned in the order of raster scanning performed considering the positions of the fill-in areas in the form.

Figure 4:
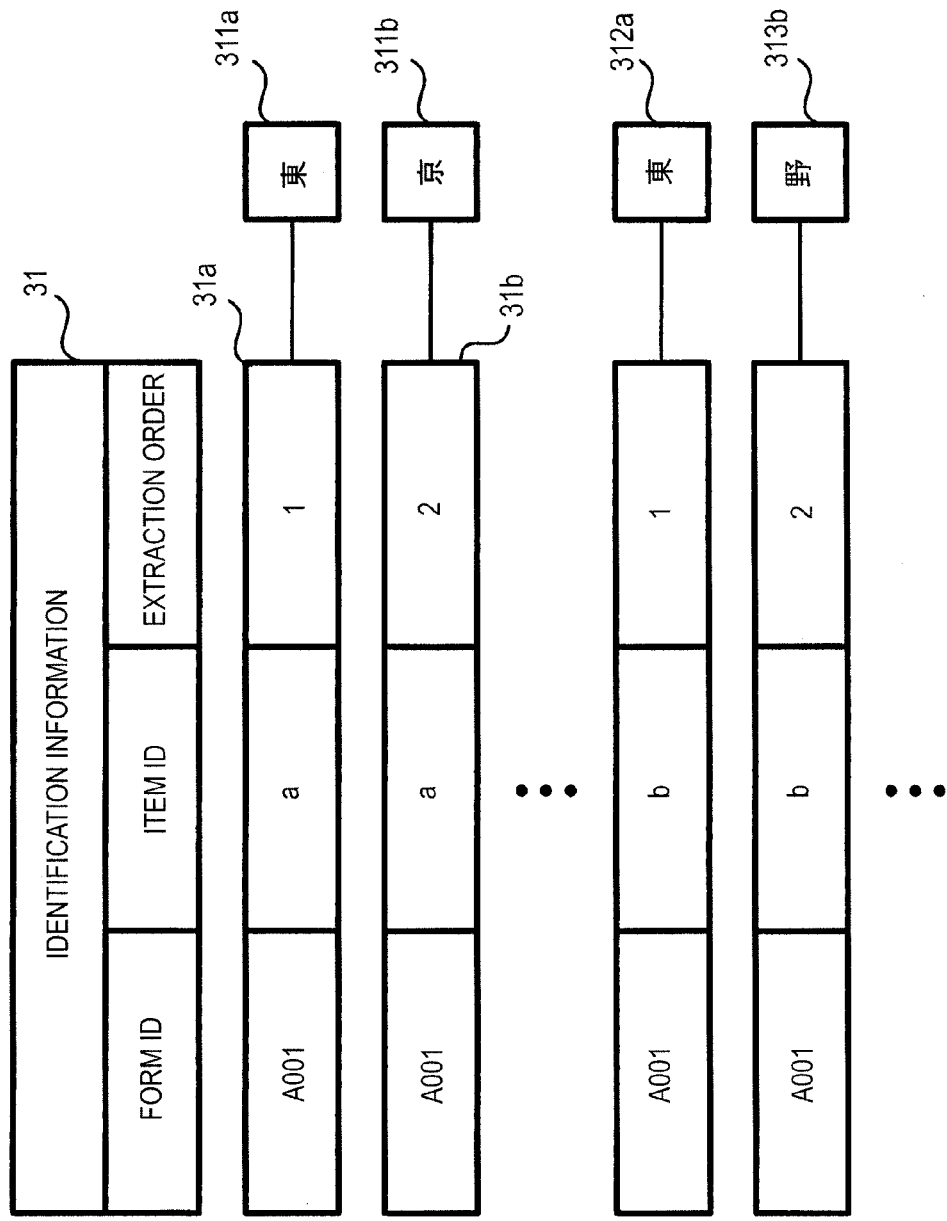
FIG. 4 is a conceptual view of original image information in the first exemplary embodiment.

FIG. 4 is a conceptual view of the original image information in which a correlation is established between the original image data pieces extracted from the form 30 of FIG. 2, and the identification information. Exemplified here is a case where, in the form item 301 for address under a "form 001" in the form 30 of FIG. 2, the fill-in area 311 is written with a character of "東", which means "east" and is pronounced as "tou", "higashi", or "azuma", in one of the areas segmented by broken lines, i.e., original image data piece 311a. In such a case, as shown in FIG. 4, the original image data piece 311a being the character of "東" is set with identification information 31a, including a form ID "A001", an item ID "a", and an extraction order "1". Similarly, with an original image data piece 311b being a character of "京", which means "city"

and is pronounced as "kyou", "kei" or "miyako", identification information 31b therefor includes a form ID "A001", an item ID "a", and an extraction order "2".

Described next is a form information table. FIG. 5 shows exemplary data in the form information table. A form information table 32 includes, with a correlation, the characteristics information and the identification information about the original image data pieces. The characteristics information is about characteristics of hand-written characters in each of the original image data pieces. Such a form information table 32 is stored with, when the characteristics information is extracted for each of the original image data pieces, the extracted characteristics information and the identification information are stored in the form of data.

Herein, the characteristics information about the hand-written characters in this exemplary embodiment is extracted by identifying the number of line segments configuring each of the hand-written characters, i.e., vertical line segments and horizontal line segments. With the original image data piece 311a being the character of "東" in FIG. 4, for example, the characteristic information extracted for this character includes one vertical line segment and four horizontal line segments. As shown in FIG. 5, with a correlation with the identification information of this original image data piece, i.e., the form ID "A001", the item ID "a", and the extraction order "1", the characteristic information of "vertical 1: horizontal 4" is generated and stored. In the characteristic information, "vertical" denotes the number of vertical line segments, and "horizontal" denotes the number of horizontal segments.

Data Input Receiving Device 200

Described next is the configuration of the data input receiving device 200. The data input receiving device 200 is implemented by a personal computer or others, and is configured to include a CPU 210, a ROM 211, a RAM 212, a storage section 213, a receiving section 214, a display section 215, and a communications section 216. The CPU 210 is operated to run a control program stored in the ROM 211 using the RAM 212 as a work area, thereby allowing components therein to function, i.e., an extraction unit 210a, a display control unit 210b, and a storage control unit 210c, and controlling the components connected to the CPU 210. That is, the extraction unit 210a extracts, from image data read by the image reading device 100, information about a form being a data input target, i.e., form information, and original image information. The display control unit 210b displays, on the display section 215, any of the original image data pieces of a character selected at random from the form information extracted by the extraction unit 210a. The storage control unit 210c generates characteristics information about characters found in text data input by an operator, and verifies the resulting characteristic information against the characteristics information about the original image data piece displayed on the display section 215. The storage control unit 210c then executes a process in accordance with the verification result.

The storage section 213 is configured by a nonvolatile storage medium such as hard disk, and stores various types of data such as application program and user data. The receiving section 214 is implemented by a ten-digit keypad, a keyboard, a mouse, and others. The receiving section 214 is operated by an operator to make an input, and forwards information about such user's input operation to the CPU 210.

The display section 215 is implemented by a display such as liquid crystal display, and displays images of various types of screens under the control of the CPU 210, e.g., character input screen for an operator's input operation of characters.

The communications section 216 forwards/receives data to/from the image reading device 100 under the control of the CPU 210.

Operation

Described next is the operation of the data input system 1 of the first exemplary embodiment. First of all, described is the operation of the image reading device 100 by referring to FIG. 6.

Operation of Image Reading Device 100

When a user places the form 30 on the image reading device 100, and when an image read operation is made to the form 30 via the receiving section 113, the CPU 110 of the image reading device 100 reads characters filled in the form by the image reading section 114 directing a light thereto (step S110). The CPU 110 then generates original image data based on an electric signal of the image being a read result (step S111).

The CPU 110 sequentially scans the original image data generated in step S111 on the basis of a fill-in area set in advance to each form item. Such scanning is performed on a pixel basis, and the original image data is accordingly divided into original image data pieces. The original image data pieces are then each set with identification information (step S112). That is, for each of the fill-in areas set to each form item in the form, values of the pixels therein are extracted, and these pixel values are checked to see whether the pixels are black pixels or not. For any of the fill-in areas determined that the number of black pixels therein is equal to or larger than a predetermined value, data of the fill-in area(s) is extracted as an original image data piece. The CPU 110 then generates identification information, including a form ID, an item ID, and an extraction order, for the original image data piece(s), and stores the identification information in the RAM 112 with a correlation with the original image data piece(s). Herein, the form ID is for identifying from which form the original image data piece(s) are extracted, and the item ID is for identifying which form item. The extraction order indicates the order of the original image data piece(s) extracted for the form item.

The CPU 110 serves to sequentially read the original image data piece(s) and the identification information stored in the RAM 112, and extract characteristics information about hand-written characters found in the original image data piece(s) read as such for each original image data piece (step S113). That is, the CPU 110 detects the number of line segments each in vertical and horizontal for the character in each original image data piece, and generates characteristics information about each original image data piece using detection results thereof, i.e., the number of line segments each in vertical and horizontal. The CPU 110 then stores, in the storage section 115, the original image information in which a correlation is established between the original image data piece(s) and the identification information. The CPU 110 also correlates the identification information set to each original image data piece(s) with the characteristics information extracted for each original image data piece in step S113, and stores the correlation result in the form information table 32 (step S114).

Operation of Data Input Receiving Device 200

Described next is the operation of the data input receiving device 200 by referring to FIG. 7.

In the data input receiving device 200, when an operator operates the receiving section 214 to issue a command for data input (step S210: YES), the CPU 210 accesses the storage section 115 of the image reading device 100 via the communications section 216, thereby reading any form information not yet provided with data from the form information table 32 in the order of form ID. The reading result is stored in the RAM 212 (step 211).

The process started by such accessing is executed, for reading data from the storage section 115 of the image reading device 100, by forwarding a request of data reading to the image reading device 100 after specifying which data is to be read from the data input receiving device 200, and by the CPU 110 of the image reading device 100 reading the requested data from the storage section 115 for transmission to the data input receiving device 200 via the communications section 116. For writing data to the storage section 115, the process is executed by the data input receiving device 200 forwarding a request of data writing to the image reading device 100 indicating which data is to be written to where, and by the CPU 110 of the image reading device 100 storing the requested data at the specified position. In the below, the expression of "accessing" means such process details.

The CPU 210 selects, in step S211, at random any of the identification information stored in the RAM 212 about the form information, and then accesses the storage section 115 of the image reading device 100 via the communications section 216, thereby reading any of the original image data pieces correlated with the selected identification information. The CPU 210 then displays a character input screen for an input target being the original image data pieces read as such (step S212).

Figure 8A:
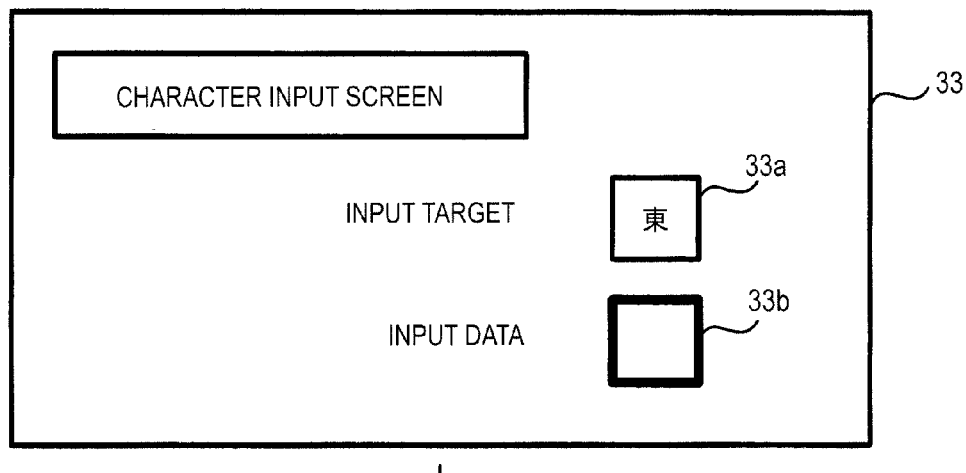
FIG. 8A is a diagram showing an exemplary screen for input of characters in the first exemplary embodiment.
Figure 8B:
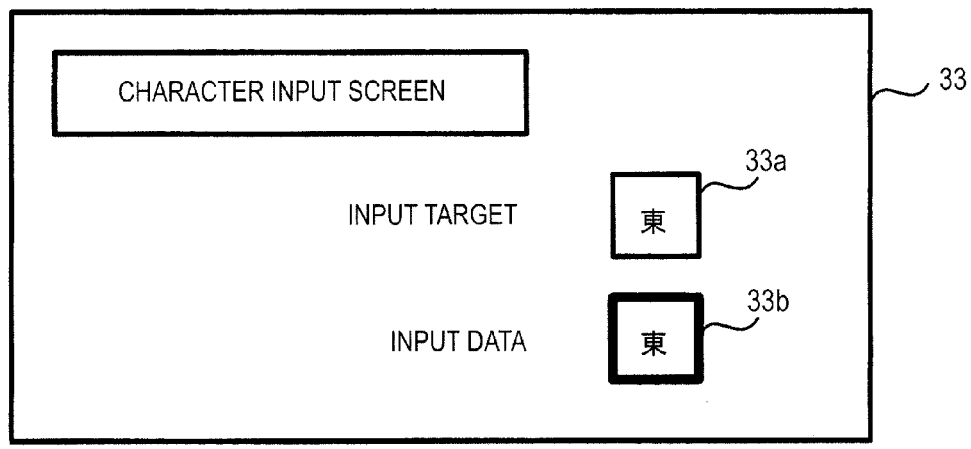
FIG. 8B is a diagram showing an exemplary screen after the input of characters on the character input screen of FIG. 8A.

By referring to FIGS. 8A and 8B, the character input screen is described. FIG. 8A shows an exemplary character input screen 33 to be displayed in step S212. The character input screen 33 of FIG. 8A shows the character of "東"as an input target 33a. The character of "東"is of the original image data piece 311a whose identification information includes the form ID "A001", the item ID "a" corresponding to the form item "address", and the extraction order "1". As shown in FIG. 8B, an operator inputs the same character as the input target 33a, i.e., "東", in an input data field 33b on the character input screen 33.

Referring back to FIG. 7, when the operator operates the receiving section 214 for input of characters on the character input screen 33 (step S213: YES), the CPU 210 generates characteristics information by detecting the number of line segments each in vertical and horizontal for the input character of "東"(step S214). In FIG. 8B example, the characteristics information about the input character of "東"is "vertical 1: horizontal 4" because the number of vertical line segments is 1, and the number of horizontal line segments is 4. The CPU 210 then reads the characteristics information stored in the RAM 212 about the form information, and determines whether or not predetermined verification requirements are satisfied by the characteristics information about the character being an input target, and the characteristics information about the character input as above (step S215). Note that, in this exemplary embodiment, such verification requirements are about a matching between the characteristics information about the input character and the characteristics information set to the original image data piece on display.

When determining in step S215 that the verification requirements about the characteristics information are satisfied, i.e., determining that there is a matching between the characteristics information (step S215: YES), in the form information stored in the RAM 212, the CPU 210 stores the character "東"input on the character input screen 33 as input data for the identification information correlated with the characteristics information determined in step S215 as being the same. The CPU 210 then accesses the storage section 115 of the image reading device 100 via the communications section 216, and writes the resulting form information to the form information table 32 for update (step S216).

FIG. 9 shows an example of the form information table 32 updated as such. As shown in the drawing, in the form information of the form ID "A001", input data 321 whatever including the characteristics information of "vertical 1: horizontal 4" is provided with text data about the character "東"input on the character input screen 33, and then is updated.

Referring back to FIG. 7, in step S217, when the form information stored in the RAM 212 is provided with the input data in its entirety, or when the operator operates the receiving section 214 to end the data input process (step S217: YES), the CPU 210 ends the data input process for the form currently selected.

Also in step S217, when the form information stored in the RAM 212 is not yet stored with input data, or when the operator does not yet operate the receiving section 214 to end the data input process (step S217: NO), the procedure returns to step S212, and the CPU 210 accesses the storage section 115 of the image reading device 100 via the communications section 216. The CPU 210 then reads, at random, any of the original image data pieces correlated to the identification information not yet provided with input data, and displays the characters of the original image data pieces read as such on the character input screen 33. As such, the process in step S212 and thereafter are repeatedly executed.

In step S210, the CPU 210 waits until the operator issues a command for the data input process through operation of the receiving section 214 (step S210: NO). In step S213, until the operator inputs any character on the character input screen 33 through operation of the receiving section 214 (step S213: NO), the CPU 210 waits with the character input screen 33 remained displayed. In step S215, when the CPU 210 determines that the verification requirements are not satisfied by the characteristics information about the original image data piece being an input target and the characteristics information about the input character, i.e., determines that there is no matching between the characteristics information (step S215: NO), the procedure repeats the process in step S213 and thereafter. Note that, in this case, a message is displayed to ask the operator to make an input of characters again on the character input screen 33, whereby the CPU 210 becomes ready for the operator's input operation of characters.

In the exemplary embodiment described above, original image data pieces of each character string filled in a form are displayed at random on a character basis, and with such a display, advantageously, details about addresses and names filled in the form items in the form does not make that much sense to an operator. Moreover, once the operator inputs an original image data piece, i.e., a character of "東", such an input operation is applied also to any other original image data pieces about the character of "東"in the same form so that the operator has no more need to repeatedly make data input for any same characters.

Second Exemplary Embodiment

Described next is a data input system in a second exemplary embodiment of the invention.

In the second exemplary embodiment, original image data is subjected to character recognition, and the resulting characters completed with recognition (hereinafter, referred to as recognized characters) are arranged in a predetermined order depending on the type of characters, e.g., numerical values, or alphabetic characters. The original image data pieces correlated to the recognized characters arranged as such are then displayed for an input operation of characters by an operator. In the below, any configuration similar to that in the first exemplary embodiment above is provided with the same reference numeral.

FIG. 10 shows an exemplary form in the second exemplary embodiment. Similarly to the form 30 in the first exemplary embodiment, a form 40 of FIG. 10 is segmented into form items 401 to 403 to be respectively filled with zip code, address, and name. These form items 401 to 403 are respectively provided with fill-in areas 411 to 413 each segmented by broken lines into a plurality of areas each for a character.

In the second exemplary embodiment, in the image reading device 100, the generation unit 110b applies pattern matching to any original image data piece whose identification information includes an item ID indicating the form item 401 of "address" to be filled with numerical values, thereby identifying which numerical value corresponds to the original image data piece. The output control unit 110c then stores the identified numerical value into a form information table 42 as text information about the original image data piece. FIG. 11 shows an exemplary form information table in this exemplary embodiment. As shown in the drawing, similarly to the form information table 32 in the first exemplary embodiment, in the form information table 42, a correlation is established between the identification information set to each of the original image data pieces, i.e., form ID, item ID, and extraction order, with the recognized characters. These recognized characters are those identified as a result of the pattern matching applied to the hand-written characters of the original image data pieces, i.e., the character-associated information correlated to each of the hand-written characters. This form information table 42 is stored with, at the time of character recognition process for each of the original image data pieces, the identification information completed with character recognition and the recognized characters.

Note here that, similarly to the first exemplary embodiment, the storage section 115 stores original image information in which the original image data pieces are correlated with the identification information, and is provided therein also with in advance data for use with pattern matching. Such data is hereinafter referred to as verification text data.

Operation

In the below, by referring to FIGS. 12 and 13, described is the operation of the data input system 1 in the second exemplary embodiment. Note here that, in FIGS. 12 and 13, any process similar to that in the first exemplary embodiment described above is provided with the same step number, and any operation different from that in the first exemplary embodiment is described by referring to FIGS. 10 and 11 examples. Described first is the operation of the image reading device 100.

Operation of Image Reading Device 100

By referring to FIG. 12, the CPU 110 of the image reading device 100 executes the processes in steps S110 to S112. The CPU 110 then reads the verification text data from the storage section 115, and using the verification text data, performs character recognition by applying pattern matching to any original image data piece whose identification information includes an item ID "a", thereby identifying a numerical value completed with the character recognition (step S123). The CPU 110 then stores the original image information in which the original image data pieces are correlated with the identification information into the storage section 115. The CPU 110 also stores, in the form information table 42, the identification information about any original image data piece including an item ID "a", and the numerical value identified for the original image data piece (step S124).

Operation of Data Input Receiving Device 200

In FIG. 13, similarly to the first exemplary embodiment, the CPU 210 of the data input receiving device 200 executes the processes in steps S210 and S211, and reads any form information of a form ID "B001" from the image reading device 100 for storage into the RAM 212.

The CPU 210 sorts, in the ascending order, any recognized characters correlated with an item ID "a" in the form information stored in the RAM 212, and accesses the storage section 115 of the image reading device 100 via the communications section 216 for reading of any original image data piece whose identification information includes an item ID "a". The CPU 210 then displays, on the character input screen, the original image data pieces correlated with the identification information about the recognized characters completed with sorting (step S221).

Figure 14A:
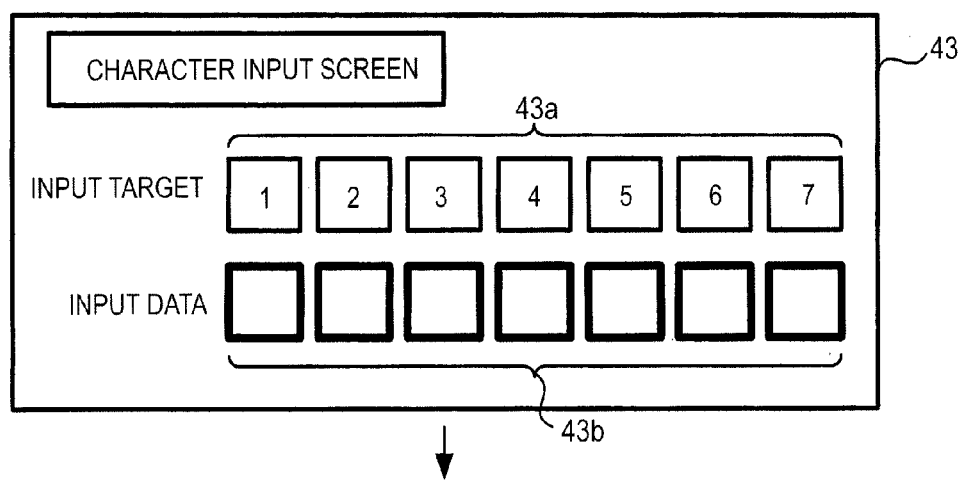
FIG. 14A is a diagram showing an exemplary screen for input of characters in the second exemplary embodiment.
Figure 14B:
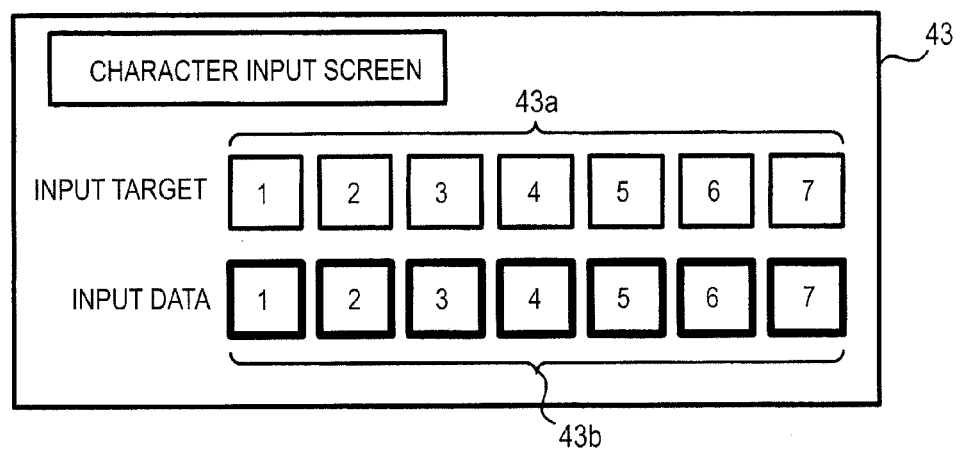
FIG. 14B is a diagram showing an exemplary screen after the input of characters on the character input screen of FIG. 14A.

Described now is the character input screen in the second exemplary embodiment by referring to FIGS. 14A and 14B. FIG. 14A shows an exemplary character input screen 43 to be displayed in step S221. On the character input screen 43, the recognized characters "5", "6", "7", "1", "2", "4", and "3" correlated with the item ID "a" under the form ID "B001" are sorted in the ascending order, and original image data pieces of the hand-written numbers correlated to the recognized characters, i.e., "1", "2", "3", "4", "5", "6", and "7", are displayed in an input target 43a. As shown in FIG. 14B, on such a character input screen 43, the operator inputs the numerical values displayed in the input target 43a into an input data field 43b.

Referring back to FIG. 13, when the operator operates the receiving section 214 to make an input of characters on the character input screen 43 (step S213: YES), the CPU 210 stores numerical data in the form information stored in the RAM 212 as input data about the identification information set to each of the original image data pieces displayed on the character input screen 43. The CPU 210 then accesses the storage section 115 of the image reading device 100 via the communications section 216 for writing of the form information thereabout into the form information table 42, thereby updating the information (step S216).

FIG. 15 shows an example of the form information table 42 updated as such. As shown in FIG. 15, in the form information table 42, an input data field 421 for the item ID "a" under the form ID "B001" is stored with the numerical data input on the character input screen 43.

In the second exemplary embodiment described above, characters such as numerical values found in a form are displayed after sorting in a predetermined order, i.e., ascending or descending order, and an operator makes data input while referring to the characters completed with sorting as such.

Note here that, in the above second exemplary embodiment, exemplified is a case where targets for character recognition are numerical values. This is surely not restrictive, and targets for character recognition may be alphabetical characters or Japanese characters. For example, after character recognition is performed to any original image data pieces in a specific form item, when the identified characters are all alphabetical characters, such recognized characters may be sorted in an alphabetical order before display. Also when the identified characters are all Japanese characters, such recognized characters may be sorted in the order of text code, or when those are Japanese numerical values, these may be sorted in the ascending or descending order. As such, for displaying the original image data pieces, the recognized characters are sorted in a predetermined order.

Third Exemplary Embodiment

In the second exemplary embodiment described above, the original image data pieces each being a numerical value are sorted in a predetermined order for display, and the resulting data is input. In a third exemplary embodiment, any characters not being the numerical values are subjected to character recognition, and from a word table stored in advance in the data input receiving device 200, any word including the recognized characters is extracted for display of the original image data pieces in the order of the extracted word. In the below, any configuration similar to that in the first exemplary embodiment described above is provided with the same reference numeral, and any different configuration is mainly described.

FIG. 16 shows an exemplary word table in such a third exemplary embodiment. As shown in FIG. 16, a word table 50 includes an element of "word ID" for identification use of words, and words of various classes, i.e., noun, adjective, and verb. Such a word table 50 is stored in advance in the storage section 213 in the data input receiving device 200.

FIG. 17 shows the form information table 42 similarly to that in the second exemplary embodiment. This form information table 42 exemplarily includes recognized characters completed with identification as a result of character recognition applied to the original image data pieces whose identification information includes a form ID corresponding to the form items 402 and 403, i.e., address and name. Herein, similarly to the second exemplary embodiment, the storage section 115 of the image reading device 100 is stored with original image information in which the original image data pieces are correlated with the identification information. The storage section 115 is also provided in advance with verification text data for pattern matching use.

Operation

Described next is the operation of the data input system 1 in the third exemplary embodiment. Because the image reading device 100 in this exemplary embodiment is similar to that in the second exemplary embodiment described above, and thus described here is only the operation of the data input receiving device 200. FIG. 18 is a flow diagram of the operation of the data input receiving device 200. In the below, a description is given by referring to FIGS. 10, 16, and 17 examples.

Similarly to the second exemplary embodiment, the CPU 210 of the data input receiving device 200 executes the processes in steps S210 and S211, and reads form information about the form ID "B001" from the form information table 42 for storage into the RAM 212. In the identification information in the form information, assumed here is that the CPU 210 selects a recognized character of "静" which means "calmness" and is pronounced as "sizu", "sei" or "jou", correlated to any identification information not yet provided with input data, i.e., identification information with a form ID "B001", an item ID "c", and an extraction order "3" (step S231). Such a recognized character is hereinafter referred to as not-yet-input recognition character. The CPU 210 then reads the word table 50 from the storage section 213, and extracts therefrom any word including the selected not-yet-input recognized character, i.e., "静岡県", which means "Shizuoka Prefecture" and is pronounced as "shizuoka ken", (step S232).

In the form information stored in the RAM 212, using any not-yet-input recognized character correlated with the identification information including an item ID different from that of the selected not-yet-input recognized character of "静", the CPU 210 determines whether or not the extracted word of "静岡県" can be configured thereby (step S233).

In step S233, when determining that the extracted word of "静岡県" can be configured by the not-yet-input character of "静", and other not-yet-input recognized characters of "岡", which means "hill" and is pronounced as "oka" or "kou", and "県", which means "Prefecture" and is pronounced as "ken", "gen" or "agata", (step S230: YES), the CPU 210 accesses the storage section 115 of the image reading device 100 via the communications section 216. Herein, the not-yet-input recognized character of "岡" is the one correlated with the identification information including a form ID "B001", an item ID "d", and an extraction order "1", and the not-yet-input recognized character of "県" is the one correlated with the identification information including a form ID "B001", an item ID "c", and an extraction order "4". The CPU 210 then reads any of the original image data pieces corresponding to such not-yet-input recognized characters, respectively, and displays on the character input screen the original image data pieces read as such in the order of the word (step S234).

Figure 19A:
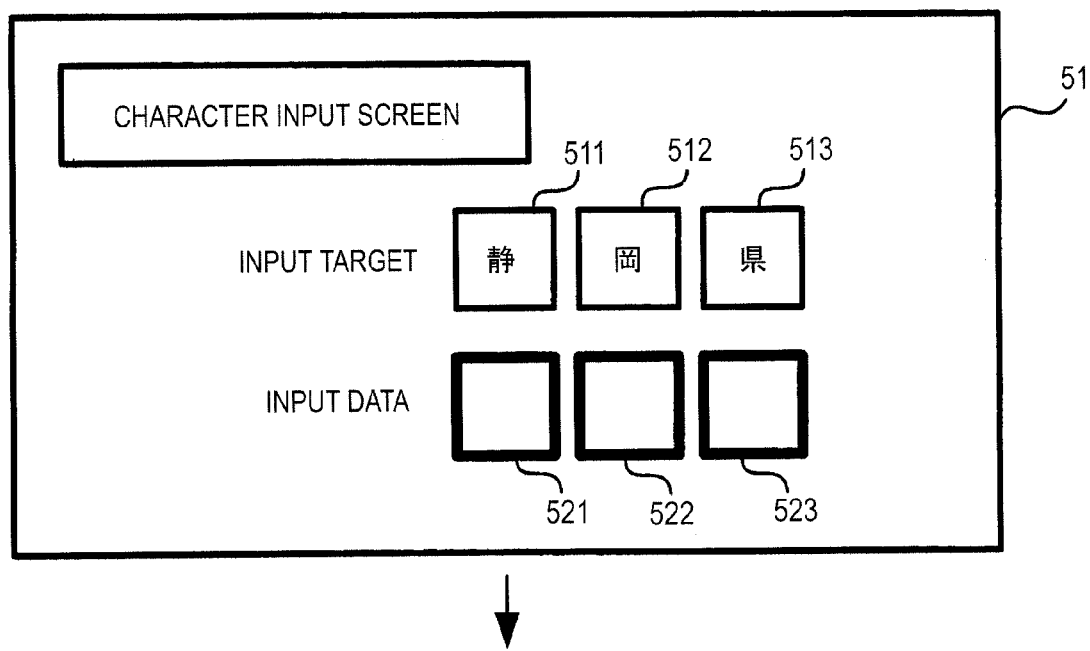
FIG. 19A is a diagram showing an exemplary screen for input of characters in the third exemplary embodiment.
Figure 19B:
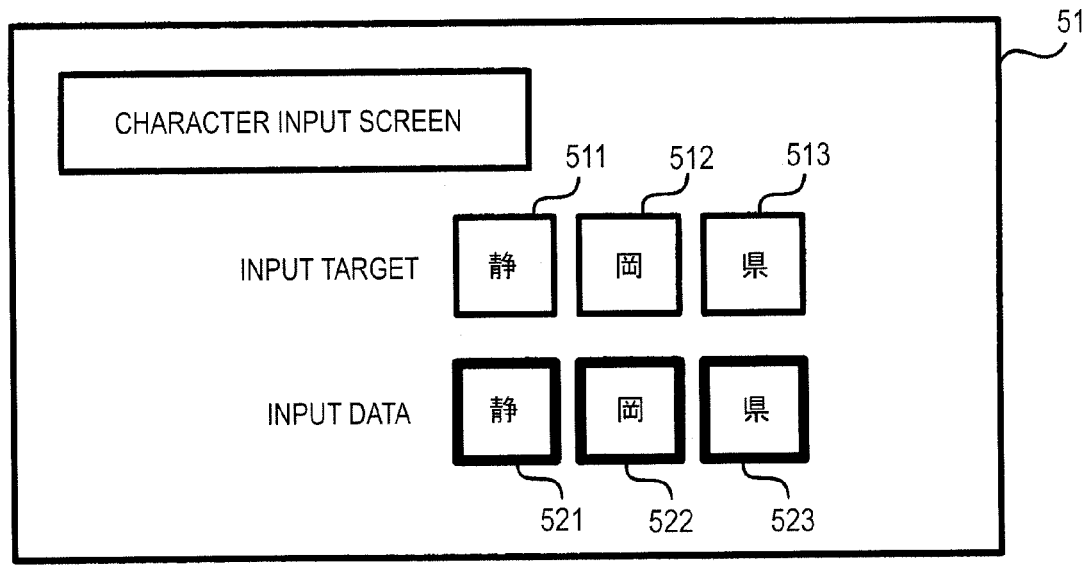
FIG. 19B is a diagram showing an exemplary screen after the input of characters on the character input screen of FIG. 19A.

FIG. 19A shows an exemplary character input screen 51 displayed as such. Input targets 511 to 513 display the original image data pieces in the order of the selected word. As shown in FIG. 19B, in fields of input data 521 to 523 respectively corresponding to the input targets 511 to 513, the characters same as those in the input targets 511 to 513 are input.

Referring back to FIG. 18, in step S213, when the character input screen 51 displayed in step S236 is provided with characters (step S213: YES), the CPU 210 executes the process in step S216 and thereafter similarly to the second exemplary embodiment. FIG. 20 shows an example of the form information table 42 completed with the process in step S216 in the above example. As shown in the drawing, the text data about "静", "岡", and "県" provided by the operator on the character input screen 51 is stored in input data 422 corresponding to the identification information set to the original image data pieces on display.

Also in FIG. 18, in step S233, when determining that the extracted word cannot be configured (step S233: NO), the CPU repeats the process in step S233, i.e., keeps performing word extraction one by one from the word table 50 (step S232) until every word in the word table 50 is completed with the process in step S233 (step S235: NO).

Also in step S235, when every word in the word table 50 is completed with the determination in step S233 (step S235: YES), the CPU 210 accesses the storage section 115 of the image reading device 100 via the communications section 216, and displays any original image data pieces on the character input screen in the order of the word (step S236). The original image pieces here are those corresponding to any not-yet-input recognized characters that can be apart of the extracted word, and to any input recognized characters. That is, when the word extracted last is "静岡県", when this word cannot be configured by not-yet-input recognized characters, another word is configured by combining input recognized characters, thereby displaying the original image data pieces respectively corresponding to the recognized characters. In this case, on the character input screen, any data completed with input is provided into the field of input data corresponding to the original image data pieces also completed with input. When no word can be configured even if the input recognized characters are combined together, any original image data pieces partially corresponding to the recognized characters being a part of the word may be displayed. In this case, as to the word of "静岡県", if the recognized character of "岡" is not found in the form information, only the original image data pieces being the characters of "静" and "県" are displayed.

As such, in the above exemplary embodiment, the characters found in the form in the order of a word making sense are displayed.

Modified Example

In the below, modified examples of the invention are described.

1. In the first exemplary embodiment described above, exemplified is the case of extracting the number of line segments both in vertical and horizontal for use as characteristics information. This is surely not restrictive, and any other methods will also do as long as extracting characteristics of characters. With an exemplary method, any density difference observed in a fill-in area between the area of character and the remaining area is extracted so that the outline of the character is detected, and information about the detected outline is extracted for use as characteristics information. With another exemplary method, a character is categorized through density detection of black pixels appearing along the four sides around the character in a fill-in area, and information about the resulting category may be generated for use as characteristics information. Still alternatively, the characteristics information generated as such may be stored with a correlation with the characteristics information in the first exemplary embodiment, and when verification requirements are satisfied, e.g., the characteristics information about any input character and the characteristics information about any original image data piece are both falling in a predetermined range of similarity, the input character may be stored with a correlation with the identification information set to the original image data piece.

2. In the above first exemplary embodiment, exemplified is the case of displaying at random the original image data pieces on a character basis. Alternatively, a plurality of original image data pieces varying in item ID may be arranged for display.

3. In the second exemplary embodiment described above, exemplified is the case of storing any input numerical value with identification information of a recognized character under the same form ID. Alternatively, the input numerical value may be stored with a correlation with the identification information set to any same recognized character under any different form ID.

4. Also in the above second exemplary embodiment, exemplified is the case of sorting any recognized characters under the same item ID in a predetermined order, and displaying original image data pieces in the same order. Alternatively, when recognized characters being numerical values are stored in a plurality of form items, the recognized characters in all of the form items may be sorted in a predetermined order, and a predetermined number of original image data pieces may be displayed in the same order.

5. In the third exemplary embodiment described above, exemplified is the case of extracting a word being a combination of recognized characters under different form items. Alternatively, any recognized characters in any same form item may be combined together to configure a word not found in the form item.

6. In the first to third exemplary embodiments described above, exemplified is the case of making data input, on a form basis, to every data input receiving device 200. Alternatively, data input receiving devices 200a and 200b may be respectively input with text data in any same form by two different operators. If this is the case, in the first and third exemplary embodiments, after extracting any original image data pieces corresponding to identification information not yet provided with data in the form information table, the data input receiving devices 200a and 200b may each set a use flag in the form information table to indicate that the identification information is in use, and may display the extracted original image data pieces. In the second exemplary embodiment, the data input receiving devices 200a and 200b each receive an input of text data in a form on a form item basis, and set a use flag to any identification information including an item ID being an input target in the form information table. The data input receiving devices 200a and 200b then each sort the original image data pieces under the item ID being an input target in a predetermined order for display.

7. In the first to third exemplary embodiments described above, exemplified is the case of, in a form including any original image data pieces, setting identification information to each of the original image data pieces in an extraction order of the original image data pieces. Alternatively, the identification information to be set may indicate the positions of the original image data pieces, e.g., coordinates of the original image data piece in a form.

8. In the first exemplary embodiment described above, the data input receiving device 200 is exemplified as storing text data provided by an operator for the original image data pieces displayed on the display section 215 with a correlation also with identification information set to any other original image data pieces including the character-associated information corresponding to the original image data pieces on display. Alternatively, the data input receiving device 200 may store, with a correlation, text data provided only for the identification information set to the original image data pieces on display. If this is the case, still alternatively, when the text data provided by the operator is displayed on the display section 215 together with such other original image data pieces, and when the operator determines to input his or her input text data as text data corresponding to the other original image data pieces, the input text data may be stored with a correlation with the identification information set to the other original image pieces.

9. In the first to third exemplary embodiments described above, the image reading device 100 is exemplified as storing, in the storage section 115 therein, with a correlation, the original image data pieces in each form completed with reading, the identification information set to each of the original image data pieces, and the character-associated information corresponding to each of the original image data pieces, i.e., characteristics information and recognized characters. Alternatively, the image reading device 100 may be so configured as to forward such data to any other device connected to the image reading device 100 and the data input receiving device 200, and store the data in such a device. If this is the case, the data input receiving device 200 may access the device storing the character-associated information (characteristics information and recognized characters) with a correlation with the original image data pieces, the identification information set to each of the original image data pieces, and the character-associated information corresponding to each of the original image data pieces, thereby performing reading of such data and writing of input text data.

10. The data input system 1 in the first to third exemplary embodiments described above is exemplarily configured by the image reading device 100 and the data input receiving devices 200. Alternatively, the image reading device 100 may be so configured as to serve also as the data input receiving device 200, and in the resulting image reading device 100, any input of text data may be provided by an operator for data input.

11. The form exemplified in the first to third exemplary embodiments above is segmented in advance into form items including fill-in areas to be filled with details of information. When the form is any medium not defined by fill-in area as such, original image data pieces may be extracted as below. That is, for example, the image reading device 100 may scan a medium filled with hand-written characters at predetermined intervals to detect a distribution of black pixels, thereby defining the space between characters filled in the medium. Thereafter, based on the character space defined as such, the image reading device 100 may extract original image data pieces on a character basis from original image data of the medium.

12. The data input receiving device 200 in the first to third exemplary embodiments described above is exemplified as including the display section 215. Alternatively, the data input receiving device 200 may be connected with an external display device such as liquid crystal display. If this is the configuration, the CPU 210 of the data input receiving device 200 may perform control to display the image of a character input screen as in the above exemplary embodiments on the display device.

13. The program to be run by the CPUs 110 and 210 of the image reading device 100 and the data input receiving device 200, respectively, in the first to third exemplary embodiments above can be distributed in the form of a computer-readable recording medium such as magnetic recording medium, e.g., magnetic tape, and magnetic disk, optical recording medium, e.g., optical disk, magneto-optical recording medium, and semiconductor memory. The program may be also downloaded to the image reading device 100 and the data input receiving device 200 using a communications unit such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. A data input system, comprising:
an image reading device including:
  a reading unit that reads, on a form basis, an original image of a form filled with characters;
  a setting unit that extracts original image data pieces as a result of dividing, on a character basis, data of the original image of the form read by the reading unit, and sets identification information for each of the original image data pieces for defining positions thereof on the form;
  a generation unit that generates, for each of the original image data pieces extracted by the setting unit, character-associated information associated therewith; and
  an output control unit that makes an output with a correlation among the original image data pieces, the identification information set to each of the original image data pieces, and the character-associated information generated for each of the original image data pieces; and
a data input receiving device including:
  a display control unit that displays the original image data pieces selected in accordance with a predetermined procedure from the original image data pieces provided by the output control unit;
  a receiving unit that receives an input of text data for use to identify which character is represented by the original image data pieces displayed by the display control unit; and
  a storage control unit that makes storage by correlating the text data received by the receiving unit with the original image data pieces displayed by the display control unit and the identification information set for the original image data pieces,
wherein the generation unit generates characteristics information for use as the character-associated information generated for each of the original image data pieces to indicate characteristics of the character represented by each of the original image data pieces, and the storage control unit generates characteristics information about the text data received by the receiving unit for the original image data pieces displayed by the display control unit, and stores, when predetermined requirements are satisfied by the generated characteristics information and the characteristics information generated for each of the original image data pieces, the text data with a correlation with the original image data pieces and the identification information of each of the original image data pieces.

2. The data input system according to claim 1,
wherein with the predetermined procedure, a predetermined number of the original image data pieces are selected at random from the original image data pieces.

3. The data input system according to claim 1,
wherein the storage control unit correlates the text data received by the receiving unit also with any other of the original image data pieces including the character-associated information whose details are similar to those of the character-associated information generated for each of the original image data pieces displayed by the display control unit.

4. The data input system according to claim 3,
wherein the display control unit does not select the original image data pieces correlated with the text data by the storage control unit.

5. A data input system, comprising:
an image reading device including:
  a reading unit that reads, on a form basis, an original image of a form filled with characters;
  a setting unit that extracts original image data pieces as a result of dividing, on a character basis, data of the original image of the form read by the reading unit, and sets identification information for each of the original image data pieces for defining positions thereof on the form;
  a generation unit that generates, for each of the original image data pieces extracted by the setting unit, character-associated information associated therewith; and
  an output control unit that makes an output with a correlation among the original image data pieces, the identification information set to each of the original image data pieces, and the character-associated information generated for each of the original image data pieces; and a data input receiving device including:
- a display control unit that displays the original image data pieces selected in accordance with a predetermined procedure from the original image data pieces provided by the output control unit;
- a receiving unit that receives an input of text data for use to identify which character is represented by the original image data pieces displayed by the display control unit; and
- a storage control unit that makes storage by correlating the text data received by the receiving unit with the original image data pieces displayed by the display control unit and the identification information set for the original image data pieces, wherein the image reading device includes a verification character storage unit that stores a predetermined plurality number of characters for use as verification characters, the generation unit identifies, for use as the character-associated information generated for each of the original image data pieces, which of the verification characters is correlated with which of the original image data pieces through verification of the original image data pieces against the plurality of verification characters stored in the verification character storage unit, and the display control unit sorts the verification characters identified as being correlated with which of the original image data pieces in accordance with a predetermined sorting order considering types of the verification characters, and displays the original image data pieces correlated with the verification characters completed with the sorting.

6. A data input system, comprising:

an image reading device including:
- a reading unit that reads, on a form basis, an original image of a form filled with characters;
- a setting unit that extracts original image data pieces as a result of dividing, on a character basis, data of the original image of the form read by the reading unit, and sets identification information for each of the original image data pieces for defining positions thereof on the form;
- a generation unit that generates, for each of the original image data pieces extracted by the setting unit, character-associated information associated therewith; and
- an output control unit that makes an output with a correlation among the original image data pieces, the identification information set to each of the original image data pieces, and the character-associated information generated for each of the original image data pieces; and a data input receiving device including:
- a display control unit that displays the original image data pieces selected in accordance with a predetermined procedure from the original image data pieces provided by the output control unit;
- a receiving unit that receives an input of text data for use to identify which character is represented by the original image data pieces displayed by the display control unit; and
- a storage control unit that makes storage by correlating the text data received by the receiving unit with the original image data pieces displayed by the display control unit and the identification information set for the original image data pieces, wherein the image reading device includes a verification character storage unit that stores a predetermined plurality number of characters for use as verification characters, the generation unit identifies, for use as the character-associated information generated for each of the original image data pieces, which of the verification characters is correlated with which of the original image data pieces through verification of the original image data pieces against the plurality of verification characters stored in the verification character storage unit, the data input receiving device includes a word storage unit that stores a predetermined plurality of words, and the display control unit extracts, from the plurality of words stored in the word storage unit, any of the words configured by the verification characters identified as being correlated with which of the original image data pieces, and displays the original image data pieces identified as being correlated with the verification characters in an order with which the verification characters configure the extracted word.

7. A data input receiving device, comprising:

a storage unit that stores data;

a reading unit that reads, on a form basis, an original image of form filled with characters;

a setting unit that extracts original image data pieces as a result of dividing, on a character basis, data of the original image of the form read by the reading unit, and sets identification information for each of the original image data pieces for defining positions thereof on the form;

a generation unit that generates, for each of the original image data pieces extracted by the setting unit, character-associated information associated therewith;

an original image data storage control unit that makes storage in the storage unit with a correlation among the original image data pieces, the identification information set for each of the original image data pieces, and the character-associated information generated for each of the original image data pieces;

a display control unit that displays the original image data pieces selected in accordance with a predetermined procedure from the original image data pieces stored in the storage unit;

a receiving unit that receives an input of text data for use to identify which character is represented by the original image data pieces displayed by the display control unit; and a text data storage control unit that makes storage in the storage unit by correlating the text data received by the receiving unit with the original image data pieces displayed by the display control unit and the identification information set for the original image data pieces, wherein the generation unit generates characteristics information for use as the character-associated information generated for each of the original image data pieces to indicate characteristics of the character represented by each of the original image data pieces, and the storage control unit generates characteristics information about the text data received by the receiving unit for the original image data pieces displayed by the display control unit, and stores, when predetermined requirements are satisfied by the generated characteristics information and the characteristics information generated for each of the original image data pieces, the text data with a correlation with the original image data pieces and the identification information of each of the original image data pieces.

8. A method for receiving a data input executed by a computer connected with an image data storage device that makes storage with a correlation among original image data pieces being results of dividing, on a character basis, an original image of a form filled with characters, identification information set for each of the original image data pieces, and character-associated information generated for each of the original image data pieces, the method comprising:

displaying the original image data pieces selected in accordance with a predetermined procedure from the original image data pieces stored in the image data storage device;

receiving an input of text data for use in identifying which character is represented by the displayed original image data pieces; and making storage, in the image data storage device, by correlating the received text data with the displayed original image data pieces and the identification information set for each of the original image data pieces, wherein the method further comprises:

generating characteristics information for use as the character-associated information generated for each of the original image data pieces to indicate characteristics of the character represented by each of the original image data pieces, generating characteristics information about the received text data, and storing, when predetermined requirements are satisfied by the generated characteristics information and the characteristics information generated for each of the original image data pieces, the text data with a correlation with the original image data pieces and the identification information of each of the original image data pieces.

9. A non-transitory computer readable medium storing a program causing a computer connected with an image data storage device that makes storage with a correlation among original image data pieces being results of dividing, on a character basis, an original image of a form filled with characters, identification information set to each of the original image data pieces, and character-associated information generated for each of the original image data pieces, to execute a process for receiving a data input, the process comprising:

displaying the original image data pieces selected in accordance with a predetermined procedure from the original image data pieces stored in the image data storage device;

receiving an input of text data for use in identifying which character is represented by the displayed original image data pieces; and making storage, in the image data storage device, by correlating the received text data with the displayed original image data pieces and the identification information set for each of the original image data pieces, wherein the process further comprises:

generating characteristics information for use as the character-associated information generated for each of the original image data pieces to indicate characteristics of the character represented by each of the original image data pieces, generating characteristics information about the received text data, and storing, when predetermined requirements are satisfied by the generated characteristics information and the characteristics information generated for each of the original image data pieces, the text data with a correlation with the original image data pieces and the identification information of each of the original image data pieces.

10. A data input receiving device, comprising:

a storage unit;

a reading unit that reads, on a form basis, an original image of a form comprising characters;

a setting unit that extracts original image data pieces by dividing, on a character basis, data of the original image, and sets identification information for each of the original image data pieces;

a generation unit that generates, for each of the original image data pieces, characteristic information that indicates characteristics of the character represented by the original image data piece;

an original image data storage control unit that stores in the storage unit the original image data pieces, and the identification information and the characteristic information correlated for each of the original image data pieces;

a display control unit that displays the original image data pieces according to a predetermined procedure from the original image data pieces stored in the storage unit;

a receiving unit that receives an input of text data for identifying which character is represented by the original image data pieces displayed by the display control unit; and a text data storage control unit that generates characteristics information about the received text data, and stores, when predetermined requirements are satisfied by the generating characteristic information and the characteristic information stored in the storage unit by correlating the text data received by the receiving unit with the original image data pieces displayed by the display control unit and the identification information set for the original image data pieces.

11. The data input receiving device according to claim 10, wherein the characteristic information comprises a number of vertical line segments and a number of horizontal line segments.

* * * * *